United States Patent
Feng

(10) Patent No.: US 10,386,945 B2
(45) Date of Patent: Aug. 20, 2019

(54) TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventor: Binfeng Feng, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 15/841,066

(22) Filed: Dec. 13, 2017

(65) Prior Publication Data
US 2018/0253165 A1    Sep. 6, 2018

(30) Foreign Application Priority Data
Mar. 2, 2017    (CN) .................... 2017 2 0196791 U

(51) Int. Cl.
*G06F 3/041*    (2006.01)
*G02B 5/02*    (2006.01)

(52) U.S. Cl.
CPC .......... *G06F 3/041* (2013.01); *G02B 5/0242* (2013.01); *G02B 5/0284* (2013.01); *G06F 2203/04103* (2013.01)

(58) Field of Classification Search
CPC .......... G06F 3/041; G06F 2203/04103; G02B 5/0284; G02B 5/0242
See application file for complete search history.

(56) References Cited

U.S. PATENT DOCUMENTS

| | | | |
|---|---|---|---|
| 2006/0170844 A1* | 8/2006 | Yuuki | G02F 1/1336 349/114 |
| 2010/0277439 A1* | 11/2010 | Charlier | G06F 1/1616 345/176 |
| 2014/0321036 A1* | 10/2014 | Kim | G02F 1/133308 361/679.01 |
| 2016/0048252 A1* | 2/2016 | Oh | G06F 3/0412 345/173 |

* cited by examiner

*Primary Examiner* — Abhishek Sarma
(74) *Attorney, Agent, or Firm* — Kinney & Lange, P.A.

(57) ABSTRACT

A touch display device is provided. The touch display device includes a display module including a first and a second display surfaces. A first and a second transparent cover plates are arranged on the first and the second display surface, respectively, and a first light-emitting unit and a second light-emitting unit are arranged at side faces of the first and second transparent cover plates, respectively.

18 Claims, 1 Drawing Sheet

TOUCH DISPLAY DEVICE

CROSS-REFERENCE TO RELATED APPLICATION

The present application claims priority to Chinese Patent Application No. 201720196791.9 filed on Mar. 2, 2017, the disclosure of which is incorporated in its entirety by reference herein.

TECHNICAL FIELD

The present disclosure relates to a field of display technology, and in particular relates to a touch display device.

BACKGROUND

With continuous development of the display technology, a touch technology has found a way into people's life increasingly. By using the touch technology, information may be input by a user using his or her hand directly or using an object so as to touch a touch screen. Therefore, dependence of the user on other input devices may be reduced or even eliminated.

The touch screen generally includes a resistive type, a capacitive type, a sound wave type, an infrared-ray type and the like. The touch screen usually may take a form of a rectangular transparent panel. A touch position on the touch screen is determined by using Cartesian Coordinates, and the touch screen performs corresponding control actions according to the touch position.

SUMMARY

The present disclosure provides a touch display device. The touch display device includes: a display module including a first display surface and a second display surface arranged opposite to the first display surface; wherein a first transparent cover plate is arranged on the first display surface, a second transparent cover plate is arranged on the second display surface, a first light-emitting unit is arranged on a side surface of the first transparent cover plate, and a second light-emitting unit is arranged on a side surface of the second transparent cover plate.

Optionally, a first touch panel is arranged between the first display surface and the first transparent cover plate, and a second touch panel is arranged between the second display surface and the second transparent cover plate.

Optionally, the display module is a transparent display module.

Optionally, a first surface of the first transparent cover plate facing a first touch surface of the first touch panel is an inclined surface relative to the first touch surface, and a second surface of the second transparent cover plate facing a second touch surface of the second touch panel is an inclined surface relative to the second touch surface.

Optionally, a third surface of the first transparent cover plate away from the first touch panel is parallel to a first touch surface of the first touch panel, a fourth surface of the second transparent cover plate away from the second touch panel is parallel to a second touch surface of the second touch panel; an angle between a first surface of the first transparent cover plate facing the first touch surface of the first touch panel and the first touch surface of the first touch panel is a first sharp angle, and an angle between a second surface of the second transparent cover plate facing the second touch surface of the second touch panel and the second touch surface of the second touch panel is a second sharp angle.

Optionally, the first transparent cover plate and the second transparent cover plate are of wedge shapes, and both the first sharp angel and the second sharp angle are in a range of 0 to 45 degrees.

Optionally, the first transparent cover plate is attached to a first touch surface of the first touch panel by an optical adhesive, and the second transparent cover plate is attached to a second touch surface of the second touch panel by the optical adhesive.

Optionally, light-diffusion particles for diffusion-reflection of lights are arranged in the first transparent cover plate and the second transparent cover plate.

Optionally, the light-diffusion particles are distributed uniformly in the first transparent cover plate and the second transparent cover plate, or the light-diffusion particles are distributed in arrays in the first transparent cover plate and the second transparent cover plate.

Optionally, the light-diffusion particles include at least one of glass particles and transparent polyvinyl chloride (PVC) particles.

Optionally, the first light-emitting unit and the second light-emitting unit include at least one of a light-emitting diode, an incandescent lamp and a Cold Cathode Fluorescent Lamp.

Optionally, the first light-emitting unit and the second light-emitting unit are arranged at a same side of the touch display device.

Optionally, the first light-emitting unit and the second light-emitting unit are arranged at different sides of the touch display device.

Optionally, the first light-emitting unit is arranged at a larger one of two side surfaces of the first transparent cover plate, and the second light-emitting unit is arranged at a larger one of two side surfaces of the second transparent cover plate.

Optionally, the first light-emitting unit is arranged at a larger one of two side surfaces of the first transparent cover plate, and the second light-emitting unit is arranged at a larger one of two side surfaces of the second transparent cover plate.

Optionally, the first light-emitting unit and the second light-emitting unit are point light sources.

Optionally, the display module is an opaque display module.

Optionally, the first transparent cover plate and the second transparent cover plate both are of wedge shapes.

Optionally, both the first display surface and the second display surface are touch surfaces.

Optionally, the first display surface is attached to the first transparent cover plate by an optical adhesive, and the second display surface is attached to the second transparent cover plate by the optical adhesive.

BRIEF DESCRIPTION OF THE DRAWINGS

The accompanying drawings provided in the present disclosure constitute a part of the specification, and are used to enhance understanding of the present disclosure. Illustrative embodiments of the present disclosure are used to explain the present disclosure and do not limit the present disclosure.

REFERENCE NUMERALS

| 1-touch display device | 10-display module |
| --- | --- |
| 11-first display surface | 12-second display surface |
| 21-first touch panel | 22-second touch panel |
| 31-first transparent cover plate | 32-second transparent cover plate |
| 41-first light-emitting unit | 42-second light-emitting unit |
| 51-first adhesive layer | 52-second adhesive layer |

DETAILED DESCRIPTION

In order to further describe a touch display device provided in embodiments of the present disclosure, a detailed description is provided hereinafter in combination with the accompanying drawings of the specification of the present disclosure.

The touch display device provided in the present disclosure may implement a double-sided touch display, and a structure of the relevant touch display device may be simplified.

The touch display device provided in the embodiments of the present disclosure may include a display module. The display module may include two display surfaces opposite to each other. A touch panel may be arranged on each of the two display surfaces. A transparent cover plate may be arranged on a touch surface of each touch panel, and a light-emitting unit may be arranged on a side surface of the transparent cover plate.

Figure 1:
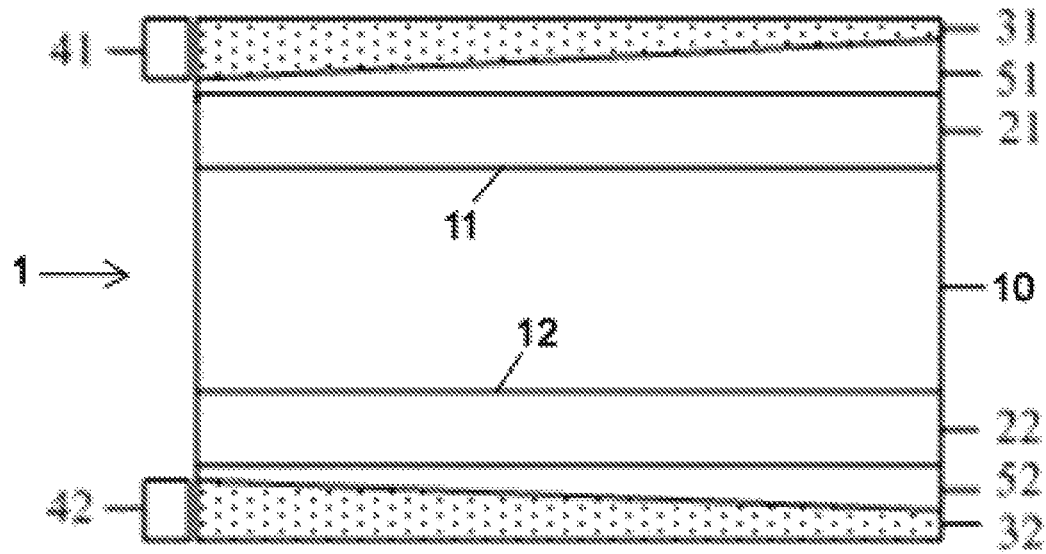
FIG. 1 is a structural schematic diagram of a touch display device provided in some embodiments of the present disclosure.
Figure 2:
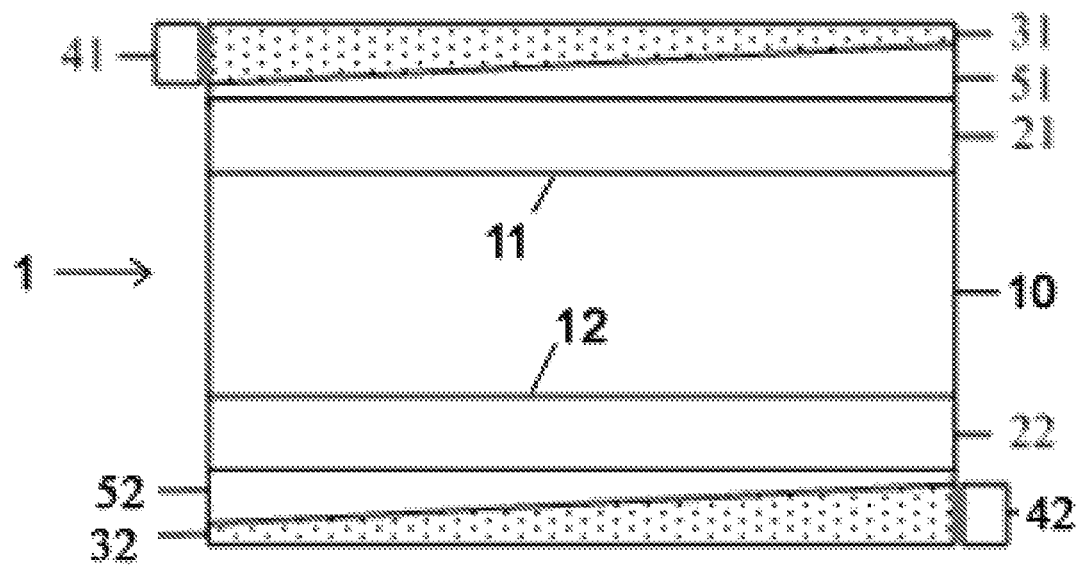
FIG. 2 is another structural schematic diagram of a touch display device provided in some embodiments of the present disclosure.

FIG. 1 and FIG. 2 are structural schematic diagrams of a touch display device 1 provided in some embodiments of the present disclosure. As shown in FIG. 1 and FIG. 2, the touch display device 1 includes a display module. The display module 10 may include a first display surface 11 and a second display surface 12. A first touch panel 21 is arranged on the first display surface 11, and a second touch panel 22 is arranged on the second display surface 12. Optionally, both the first display surface 11 and the second display surface 12 may also be touch panels. In such a case, the first touch panel 21 and the second touch panel 22 may also not be included in the touch display device in the embodiments of the present disclosure. A first transparent cover plate 31 is arranged on a first touch surface of the first touch panel 21, and a second transparent cover plate 32 is arranged on a second touch surface of the second touch panel 22. A first light-emitting unit 41 may be arranged on one of two side surfaces of the first transparent cover plate 31, and a second light-emitting unit 42 may be arranged on one of two side surfaces of the second transparent cover plate 32. The first light-emitting unit 41 and the second light-emitting unit 42 are point light sources, i.e., each of a light-emitting area of the first light-emitting unit 41 and a light-emitting area of the second light-emitting unit 42 is far less than an area of the first display surface or an area of the second display surface.

The first light-emitting unit 41 and the second light-emitting unit 42 may be arranged on a same side of the display module 10, as shown in FIG. 1. Alternatively, the first light-emitting unit 41 and the second light-emitting unit 42 may be arranged on different sides of the display module 10, as shown in FIG. 2.

A larger one of the two side surfaces of the first transparent cover plate 31 perpendicular to the first touch surface of the first touch panel is a light incidence surface of the first transparent cover plate 31, and a larger one of the two side surfaces of the second transparent cover plate 32 perpendicular to the second touch surface of the second touch panel is a light incidence surface of the second transparent cover plate 32. One of upper and lower surfaces of the first transparent cover plate 31 in contact with the first touch surface of the first touch panel 21 is a light emergence surface of the first transparent cover plate 31, and one of upper and lower surfaces of the second transparent cover plate 32 in contact with the second touch surface of the second touch panel 22 is a light emergence surface of the second transparent cover plate 32.

The following description is given by taking the first display surface 11 as an example. Light emitted from the first light-emitting unit 41 may enter the first transparent cover plate 31 through the light incidence surface of the first transparent cover plate 31, and then exit from the light emergent surface of the first transparent cover plate 31 and be incident onto the display module 10, so that an image may be displayed on the first display surface 11 of the display module 10. When control to the touch display device 1 is desired by a user, the user may touch the first transparent cover plate 31 by a finger or a stylus, a pressure sensed by the first transparent cover plate 31 may be transferred to the first touch panel 21 to achieve the control to the touch display device 1.

The following description is given by taking the second display surface 11 as an example. Light emitted from the second light-emitting unit 42 may enter the second transparent cover plate 32 through the light incidence surface of the second transparent cover plate 31, and then exit from the light emergent surface of the second transparent cover plate 32 and be incident onto the display module 10, so that an image may be displayed on the second display surface 12 of the display module 10. When control to the touch display device 1 is desired by the user, the user may touch the second transparent cover plate 32 by a finger or a stylus, a pressure sensed by the second transparent cover plate 32 may be transferred to the second touch panel 22 to achieve the control to the touch display device 1.

It may be known from the above examples that, by providing the display module 10 including the two display surfaces in the touch display device 1 in the embodiments of the present disclosure, one touch panel may be arranged on each of the display surfaces, and by performing a touch operation with the two touch panels, a double-sided touch display may be achieved in the touch display device. In addition, by providing the transparent cover plates on the touch surfaces of the touch panels and providing the light-emitting units on the side surfaces of the transparent cover plates in the touch display device 1 in the embodiments of the present disclosure, light emitted from the light-emitting units may pass through the transparent cover plates during display. Each of the transparent cover plates may convert the light emitted from the point light source arranged at the light incidence surface of the transparent cover plate to light of a surface light source, and thus uniformity of light incident onto the corresponding display surface may be improved. Furthermore, since the light-emitting units are arranged on the side surfaces of the transparent cover plates in the touch display device in the embodiments of the present disclosure, i.e., the light-emitting units are taken as a part of the touch display device in the embodiments of the present disclosure, an external light source may be omitted and a footprint of the touch display device may be reduced.

The first light-emitting unit 41 and the second light-emitting unit 42 in the embodiments of the present disclosure are not specifically limited. All light-emitting units capable of providing a function of the light sources in the touch display device 1 may be used in the embodiments of the present disclosure. For example, the first light-emitting unit 41 and the second light-emitting unit 42 may include at least one of a Light Emitting Diode (LED) light source, an incandescent lamp, a Cold Cathode Fluorescent Lamp. Alternatively, the LED light source may be used as the first light-emitting unit 41 and the second light-emitting unit 42 to provide the touch display device 1 in the embodiments of the present disclosure with a longer life and a better display effect because the LED light source has advantages of a fast response speed and a high luminescence efficiency and a brightness thereof will not be lowered even after being used for a long period of time.

It should be noted that, the first transparent cover plate 31 and the first touch surface of the first touch panel 21 are attached to each other by an optical adhesive, and the second transparent cover plate 32 and the second touch surface of the second touch panel 22 are also attached to each other by the optical adhesive. Other optical adhesive capable of attaching the transparent cover plates and the touch surfaces of the touch panels may be used as well. If the optical adhesive is used to attach the transparent cover plates to the touch surfaces of the touch panels, the first transparent cover plate 31 may be attached to the first touch surface of the first touch panel 21 by a first adhesive layer 51 formed by the optical adhesive, and the second transparent cover plate 32 may be attached to the second touch surface of the second touch panel 22 by a second adhesive layer 52 formed by the optical adhesive.

Each of the first transparent cover plate 31 and the second transparent cover plate 32 may have a wedge shape. Specifically, as shown in FIG. 1, a surface of the first transparent cover plate 31 away from the first touch panel 21 is parallel to the first touch surface of the first touch panel 21, and a surface of the first transparent cover plate 31 facing the first touch panel 21 is an inclined surface relative to the first touch surface of the first touch panel 21. Specifically, an angle between the surface of the first transparent cover plate 31 facing the first touch panel 21 and the first touch surface of the first touch panel 21 is a sharp angle. Optionally, the shape angle is in a range of 0-45 degrees. Because the surface of the first transparent cover plate 31 away from the touch panel 21 is parallel to the first touch surface of the first touch panel 21 and the angle between the surface of the first transparent cover plate 31 facing the first touch panel 21 and the first touch surface of the first touch panel 21 is the sharp angle, the first adhesive layer 51 between the first transparent cover plate 31 and the first touch panel 21 may, after being cured, form a wedge shape complementary to the wedge shape of the first transparent cover plate 31 after the first transparent cover plate 31 is attached to the first touch panel 21 by the first adhesive layer 51. Therefore, after the first transparent cover plate 31 has been attached to the first touch panel 21 by the first adhesive layer 51, bodies of the two wedge shapes may be attached together more firmly by a self-locking phenomenon caused by a frictional angle between the bodies of the two wedge shapes, so that the first transparent cover plate 31 and the first touch panel 21 may be attached to each other more firmly. In this aspect, materials of the first adhesive layer 51 and the first transparent cover plate 31 are selected to have a friction angle larger than the sharp angle between the surface of the first transparent cover plate 31 facing the first touch panel 21 and the first touch surface of the first touch panel 21.

In a similar way, a surface of the second transparent cover plate 32 away from the second touch panel 22 is parallel to the second touch surface of the second touch panel 22, and a surface of the second transparent cover plate 32 facing the second touch panel 22 is an inclined surface relative to the second touch surface of the second touch panel 22. Specifically, an angle between the surface of the second transparent cover plate 32 facing the second touch panel 22 and the second touch surface of the second touch panel 22 is a sharp angle. Optionally, the shape angle is in a range of 0-45 degrees. After the second transparent cover plate 32 has been attached to the second touch panel 22 by the second adhesive layer 52, the second adhesive layer 52 between the second transparent cover plate 32 and the second touch panel 22 may, after being cured, form in a wedge shape complementary to the wedge shape of the second transparent cover plate 32 after the second transparent cover plate 32 is attached to the second touch panel 22 by the second adhesive layer 52. Therefore, after the second transparent cover plate 32 has been attached to the second touch panel 22 by the second adhesive layer 52, bodies of the two wedge shapes may be attached together more firmly by the self-locking phenomenon caused by a frictional angle between the bodies of the two wedge shapes, so that the second transparent cover plate 32 and the second touch panel 22 may be attached to each other more firmly. In this aspect, materials of the second adhesive layer 52 and the second transparent cover plate 32 are selected to have a friction angle larger than the sharp angle between the surface of the second transparent cover plate 32 facing the second touch panel 22 and the second touch surface of the second touch panel 22.

By taking the first transparent cover plate 31 shown in FIG. 1 as an example, an angle exists between the surface of the first transparent cover plate 31 facing the first touch panel 21 and the first touch surface of the first touch panel 21 because the surface of the first transparent cover plate 31 facing the first touch panel 21 is the inclined surface. Therefore, after light emitted from the first light-emitting unit 41 enters the first transparent cover plate 31, an incident angle of light incident on the surface of the first transparent cover plate 31 facing the first touch panel 21 is reduced with respect to a case in which the surface of the first transparent cover plate 31 facing the first touch panel 21 is parallel to the first touch surface of the first touch panel 21 because of the angle between the surface of the first transparent cover plate 31 facing the first touch panel 21 and the first touch surface of the first touch panel 21, i.e., the angle between the surface of the first transparent cover plate 31 facing the first touch panel 21 and the first touch surface of the first touch panel 21 as shown in FIG. 1, so that a refraction angle of light refracted out of the surface of the first transparent cover plate 31 facing the first touch pane 21 may be reduced correspondingly. In other words, a direction of light refracted out of the surface of the first transparent cover plate 31 facing the first touch panel 21 is closer to a direction of the normal line of the surface of the first transparent cover plate 31 facing the first touch panel 21, so that collimation of light incident onto the first display surface 11 of the display module 1 is better, and a display effect of the touch display device 1 provided in the embodiments of the present disclosure is better. Similarly, collimation of light incident onto the second display surface of the display module 1 is better by arranging the surface of the second transparent cover plate 32 facing the second touch panel 22 to be the inclined surface, i.e., arranging the surface of the second transparent cover plate 32 facing the second touch panel 22 and the second touch surface of the second touch panel 22 to form the angle therebetween, so that the display effect of the touch display device provided in the embodiments of the present disclosure may be improved.

In addition, the display module 10 in the above embodiments may be an opaque display module or a transparent display module. In case that the display module 10 is the opaque display module, only the image displayed on the first display surface 11 may be seen from the first display surface 11 of the display module 10, and only the image displayed on the second display surface 12 may be seen from the second display surface 12 of the display module 10.

In case that the display module 10 is the transparent display module, a transparent display may be achieved by the touch display device 1. In terms of visual experience, a viewer at one side of the transparent display module 10 may see an object at the other side of the transparent display module 10, and a feeling of infinite space is brought to the viewer.

Theoretically, light emitted from the first light-emitting unit 41 may be displayed on the first display surface 11 by the transparent display module 10, and light emitted from the second light-emitting unit 42 may be displayed on the second display surface 12 by the transparent display module 10. However, since the transparent display module 10 is light-transmittable, a portion of the light emitted from the first light-emitting unit 41 may enter the second display surface 12 through the transparent display module 10 when the light emitted from the first light-emitting unit 41 is shown on the first display surface 11 by the transparent display module 10, and a portion of the light emitted from the second light-emitting unit 42 enter the first display surface 11 through the transparent display module 10 when the light emitted from the second light-emitting unit 42 is shown on the second display surface 12 by the transparent display module 10. Therefore, when an image is displayed on the first display surface 11, light used to display the image includes the portion of the light emitted from the second light-emitting unit 42; and when an image is displayed on the second display surface 12, light used to display the image includes the portion of the light emitted from the first light-emitting unit 41. Because the light emitted from the first light-emitting unit 41 and the light emitted from the second light-emitting unit 42 in the embodiments of the present disclosure are white lights, the light emitted from the second light-emitting unit 42 will not interfere with the image displayed on the first display surface 11. Similarly, the light emitted from the first light-emitting unit 41 will not interfere with the image displayed on the second display surface 12. Therefore, a double-sided display without interference may be achieved in the touch display device 1 in the embodiments of the present disclosure.

Furthermore, as shown in FIG. 1, light-diffusion particles used for diffusion-reflection of lights may be arranged in the above first transparent cover plate 31 and the second transparent cover plate 32. By adding the light-diffusion particles in the first transparent cover plate 31 and the second transparent cover plate 32, light conductibility of the first transparent cover plate 31 and the second transparent cover plate 32 may be improved, thereby improving uniformity of the lights emitted from the first transparent cover plate 31 and the second transparent cover plate 32. Light-diffusion particles capable of improving uniformity of the lights emitted from the transparent cover plates may be used in the present disclosure, and are not limited in the present disclosure. For example, the light-diffusion particles may be at least one of glass particles and polyvinyl chloride (PVC) transparent particles.

It should be noted that, the light-diffusion particles may be distributed uniformly in the first transparent cover plate 31 and the second transparent cover plate 32. The light-diffusion particles may also be distributed in arrays in the first transparent cover plate 31 and the second transparent cover plate 32. Emergent lights through the transparent cover plates may be more uniform when the light-diffusion particles are distributed uniformly in the first transparent cover plate 31 and the second transparent cover plate 32. Thus, a better display effect may be achieved. When the light-diffusion particles are distributed in arrays in the first transparent cover plate 31 and the second transparent cover plate 32, emergent lights through the first transparent cover plate 31 and the second transparent cover plate 32 may, after being diffusion-reflected by the light-diffusion particles, be distributed in distribution rules corresponding to the arrays in the transparent cover plates, so that a better display effect may be achieved when the lights are incident onto the display surfaces.

In the touch display device provided in the present disclosure, a double-sided touch display may be achieved by providing a display module including two display surfaces, providing a touch panel on each of the display surfaces, and performing a touch control operation using the two touch panels. In addition, by providing the transparent cover plates on the touch surfaces of the touch panels and providing the light-emitting units on the side surfaces of the transparent cover plates in the touch display device of the present disclosure, the lights emitted from the light-emitting units may pass through the transparent cover plates during display, and the transparent cover plates convert the lights of the point light sources incident onto the light-incidence surfaces of the transparent cover plates to lights of surface light sources, thereby improving light uniformity of the lights incident onto the display panels. In addition, by arranging the light-emitting units on the side surfaces of the transparent cover plates in the touch display device provided by the present disclosure, the light-emitting units are taken as a part of the touch display device of the present disclosure. Thus, external light sources may be omitted and a footprint of the touch display device may be reduced.

In above descriptions of the embodiments, specific characteristics, structures, materials, or features may be combined in a suitable manner in any one or more embodiments or examples.

Above are specific embodiments of the present disclosure only. The protection scope of the present disclosure is not limited to these embodiments. Any variation or replacement conceivable by those skilled in the art within disclosed technical scopes of the present disclosure should be included in the protection scope of the present disclosure. Therefore, the protection scope of the present disclosure should be determined according to the scope of the appended claims.

What is claimed is:
1. A touch display device, comprising:
a display module comprising a first display surface and a second display surface arranged opposite to each other; wherein:
a first transparent cover plate is arranged on the first display surface, a second transparent cover plate is arranged on the second display surface, a first light-emitting unit is arranged on a side surface of the first transparent cover plate, and a second light-emitting unit is arranged on a side surface of the second transparent cover plate, a first touch panel is arranged between the first display surface and the first transparent cover plate, and a second touch panel is arranged between the second display surface and the second transparent cover plate, a first surface of the first transparent cover plate facing a first touch surface of the first touch panel is an inclined surface relative to the first touch surface, and a second surface of the second transparent cover plate facing a second touch surface of the second touch panel is an inclined surface relative to the second touch surface, and the first transparent cover plate is attached to the first touch surface of the first touch panel by an optical adhesive, and the second transparent cover plate is attached to the second touch surface of the second touch panel by an optical adhesive.

2. The touch display device according to claim 1, wherein the display module is a transparent display module.

3. The touch display device according to claim 1, wherein:
a third surface of the first transparent cover plate away from the first touch panel is parallel to the first touch surface of the first touch panel, a fourth surface of the second transparent cover plate away from the second touch panel is parallel to the second touch surface of the second touch panel; and an angle between the first surface of the first transparent cover plate facing the first touch surface of the first touch panel and the first touch surface of the first touch panel is a first sharp angle, and an angle between the second surface of the second transparent cover plate facing the second touch surface of the second touch panel and the second touch surface of the second touch panel is a second sharp angle.

4. The touch display device according to claim 3, wherein the first transparent cover plate and the second transparent cover plate are of wedge shapes, and both the first sharp angle and the second sharp angle are in a range of 0 to 45 degrees.

5. The touch display device according to claim 1, wherein light-diffusion particles for diffusion-reflection of light are arranged in the first transparent cover plate and the second transparent cover plate.

6. The touch display device according to claim 5, wherein:
the light-diffusion particles are distributed uniformly in the first transparent cover plate and the second transparent cover plate, or
the light-diffusion particles are distributed in arrays in the first transparent cover plate and the second transparent cover plate.

7. The touch display device according to claim 5, wherein the light-diffusion particles comprise at least one of glass particles and transparent polyvinyl chloride (PVC) particles.

8. The touch display device according to claim 1, wherein the first light-emitting unit and the second light-emitting unit comprise at least one of a light-emitting diode, an incandescent lamp and a Cold Cathode Fluorescent Lamp.

9. The touch display device according to claim 4, wherein the first light-emitting unit and the second light-emitting unit are arranged at a same side of the touch display device.

10. The touch display device according to claim 4, wherein the first light-emitting unit and the second light-emitting unit are arranged at different sides of the touch display device.

11. The touch display device according to claim 9, wherein the first light-emitting unit is arranged at a larger one of two side surfaces of the first transparent cover plate, and the second light-emitting unit is arranged at a larger one of two side surfaces of the second transparent cover plate.

12. The touch display device according to claim 10, wherein the first light-emitting unit is arranged at a larger one of two side surfaces of the first transparent cover plate, and the second light-emitting unit is arranged at a larger one of two side surfaces of the second transparent cover plate.

13. The touch display device according to claim 1, wherein the first light-emitting unit and the second light-emitting unit are point light sources.

14. The touch display device according to claim 1, wherein the display module is an opaque display module.

15. The touch display device according to claim 2, wherein the first transparent cover plate and the second transparent cover plate both are of wedge shapes.

16. The touch display device according to claim 1, wherein:
a projection of the first transparent cover plate on the first display surface is the same as a projection of the first touch panel on the first display surface and is the same as a projection of the first display surface on the second display surface; and a projection of the second transparent cover plate on the second display surface is the same as a projection of the second touch panel on the second display surface and is the same as a projection of the second display surface on the first display surface.

17. A touch display device comprising:
a display module comprising a first display surface and a second display surface arranged opposite to each other, wherein both the first display surface and the second display surface are touch surfaces;

wherein:
a first transparent cover plate is arranged on the first display surface, a second transparent cover plate is arranged on the second display surface, a first light-emitting unit is arranged on a side surface of the first transparent cover plate, and a second light-emitting unit is arranged on a side surface of the second transparent cover plate, a first surface of the first transparent cover plate facing the first display surface is an inclined surface relative to the first display surface, and a second surface of the second transparent cover plate facing the second display surface is an inclined surface relative to the second display surface, and the first display surface is attached to the first transparent cover plate by an optical adhesive, and the second display surface is attached to the second transparent cover plate by an optical adhesive.

18. The touch display device according to claim 17, wherein:
a projection of the first transparent cover plate on the first display surface is the same as a projection of the first display surface on the second display surface; and a projection of the second transparent cover plate on the second display surface is same as a projection of the second display surface on the first display surface.

* * * * *